W. S. WOOD.
UNIVERSAL JOINT.
APPLICATION FILED OCT. 1, 1917.
1,290,825.
Patented Jan. 7, 1919.
2 SHEETS—SHEET 1.
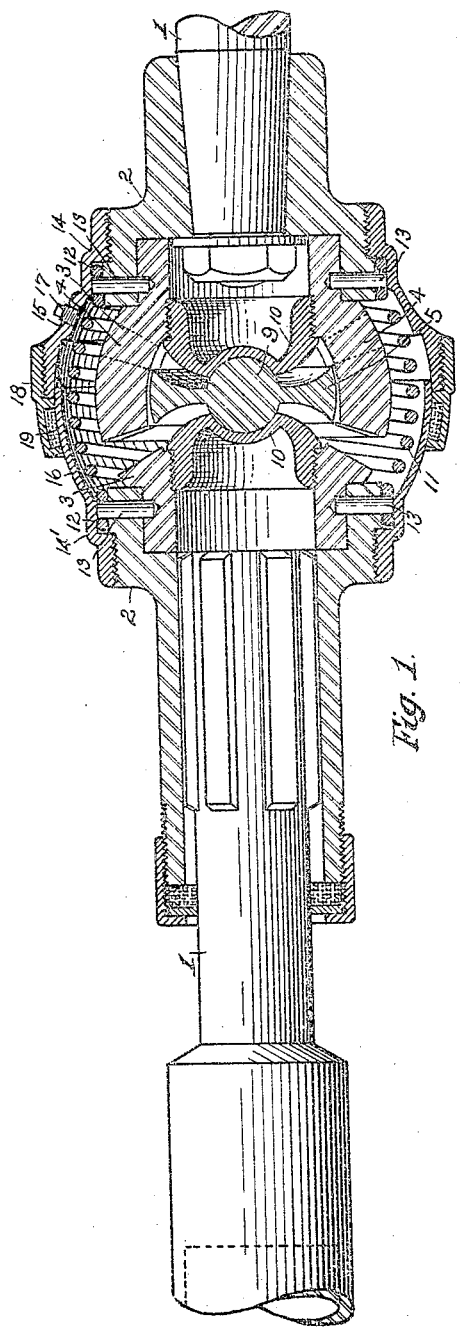
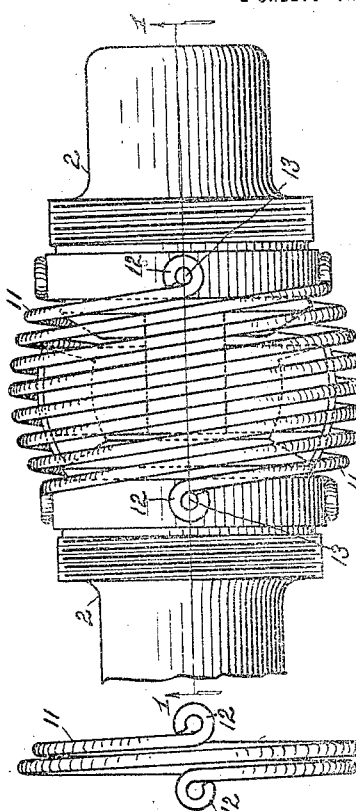
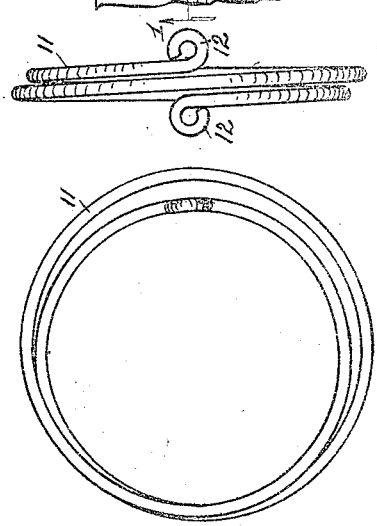
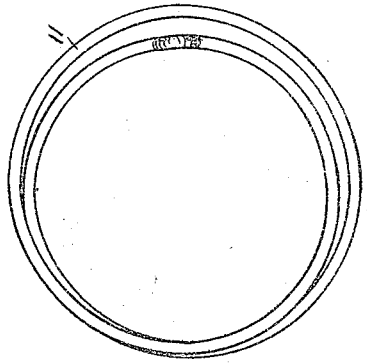
Witnesses:
Stanley K. Wood
Florence M. Wright
Inventor,
Walter S. Wood

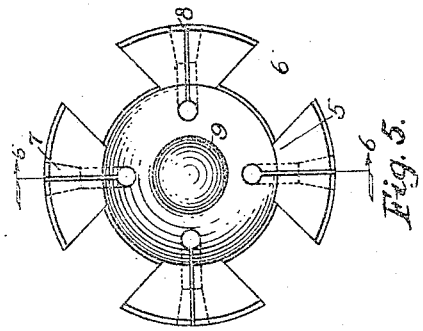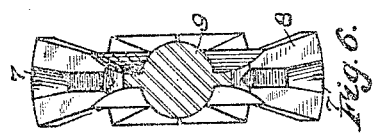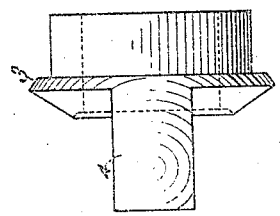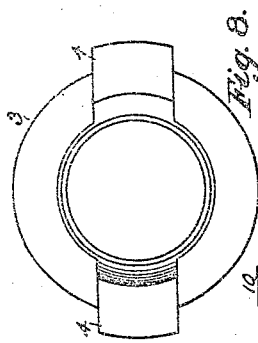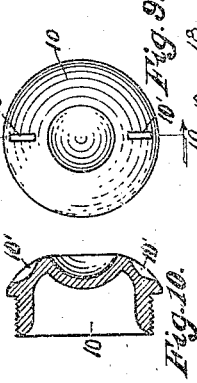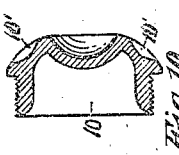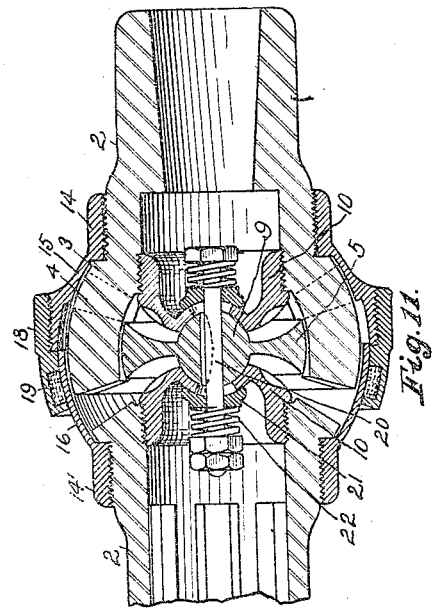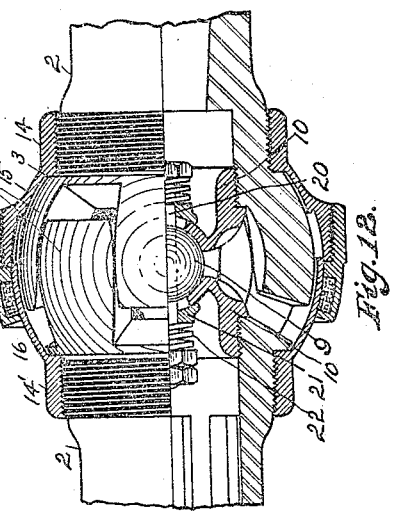

UNITED STATES PATENT OFFICE.

WALTER S. WOOD, OF KALAMAZOO, MICHIGAN.

UNIVERSAL JOINT.

1,290,825.  Specification of Letters Patent.  Patented Jan. 7, 1919.

Application filed October 1, 1917. Serial No. 194,188.

*To all whom it may concern:*

Be it known that I, WALTER S. WOOD, a citizen of the United States, residing at the city of Kalamazoo, county of Kalamazoo, and State of Michigan, have invented certain new and useful Improvements in Universal Joints, of which the following is a specification.

My invention relates to that class of universal joints for coupling sections of rotating shafts required to operate in variable angular positions and consists, substantially of opposing engaging members adapted to be suitably secured to the ends of said shaft sections and operatively maintained in their true spherical alinement substantially at their spherical centers, for the purpose of reducing friction and consequent wear of parts.

The objects of my invention are: to provide in a universal joint similar opposing driving members adapted to engage with each other, or with a central transmission-disk common to both, said parts being retained in true spherical alinement by means of opposing spherical cups within the interior of said driving members, and a central spherical member interposed between said cups, and suitable means to retain said cups in working contact with said central spherical member, thereby greatly reducing the friction and consequent wear upon the moving or working parts of this class of joints. Other objects will be more definitely defined in the detailed description to follow.

I accomplish the objects of my invention by the devices illustrated and means described in this specification and more definitely pointed out in the claims.

Structures embodying the features of my invention are clearly illustrated in the accompanying drawings which form a part of this specification, in which:—

Figure 1 is a longitudinal section through my improved joint taken on a line corresponding to line 1 1 of Fig. 2. Fig. 2 is a plan view of a portion of Fig. 1 with the outside casing removed. Figs. 3 and 4 are detail views of one of the members appearing in Figs. 1 and 2. Fig. 5 is a side elevation of the transmission-disk and Fig. 6 is a section of same taken on line 6 6 of Fig. 5. Figs. 7 and 8 are detail views of one of the driving members appearing in Fig. 1. Fig. 9 is an elevation of one of the spherical engaging cups appearing in Fig. 1 and Fig. 10 is a section of same taken on line 10 10 of Fig. 9. Figs. 11 and 12 are longitudinal sections illustrating certain modifications of construction to be more fully referred to hereinafter.

In the drawings the sectional views are taken looking in the direction of the little arrows at the ends of the sectional lines and similar reference characters refer to similar parts throughout the several views.

Referring to the details of construction, 1 1 represents the ends of two shaft sections coupled together with my improved coupling, one end being shown as a rigid connection and the other as a splined connection, both of which are well known and substantially as used in automobile construction. 2 2 are hubs or coupling members to which said shaft ends are connected. 3 3 are opposing driving members rigidly secured to said hubs as shown in Fig. 1. These driving members are identically alike, either of which may be the driving or driven member and each are provided with a pair of engaging projections or driving jaws 4 4, as particularly shown in Figs. 1, 7 and 8.

Centrally located within the joint is a transmission-disk 5. This disk has four slots or openings 6, cut from its periphery at right angles to each other as shown in Fig. 5 and are adapted to receive the projections or jaws 4 of the driving members 3. Each pair of jaws of said driving members are engaged with the two slots in said disk which are diametrically opposite, so that the jaws of each driving member shall lie in planes at right angles to each other, which will permit the joint to operate with freedom at varying shaft angles. Midway between the slots in the periphery of said disk are inserted taper-head screws 7 as shown in Figs. 5 and 6. These screws are for the purpose of adjusting said slots for wear, the disk being slotted longitudinally with said screws, as at 8, shown in Figs. 5 and 6, which permits the parts each side of said screws to spring apart as said screws are turned in, thus closing the slot 6 to cause it to fit more closely about the jaws 4. Transmission-disk 5 is also provided with a central spherical member 9, as particularly shown and pointed out in Figs. 1, 5 and 6.

Screw threaded or otherwise secured to the interior of driving members 3, is the spherically cup-shaped members 10, adapted to engage opposite sides of the spherical member 9, as shown in Fig. 1. These cup-shaped members engaging with said spherical member holds all parts or members of the joint in their relatively true spherical alinement and permits of a free and easy variation of shaft angles within the limits for which said joint may be constructed and with much less friction and consequent wear than would be the case were the parts held in position by means of a casing spherically engaging the outside of said driving members, as is more commonly done in this class of joints. Cup members 10 are provided with the notches 10', as shown in Figs. 9 and 10, for the purpose of applying a spanner wrench or screw driver to turn them to place.

For the purpose of holding the engaging members of this joint in their true spherical alinement with said spherical member, I employ a series of tension-springs 11, which are shown in position in Figs. 1 and 2 and in detail in Figs. 3 and 4, where they are shown in substantially their normal position. The ends of these springs terminate in an eye 12, as shown in Fig. 3. Four of these springs are used in the joint herewith illustrated, although this number may be varied to suit conditions and circumstances, and other yielding members or means may be employed. In assembling, the opposing eyes of these springs are engaged on the opposing pins 13 inserted in the opposing hub members 2, as shown in Figs. 1 and 2. This places the spring in tension and by using four of them equally spaced around said hub members, the tension force exerted by said springs to hold the opposing cup members 10 closely against the spherical member 9 becomes equally distributed and allows perfect freedom of movement of the various parts during the various changes in shaft angles.

For the purpose of incasing the various parts of my joint and protecting them against dust and dirt, and also to provide a chamber for lubricant for properly lubricating the same, I employ substantially a telescoping spherically shaped casing, composed of the annular ring portions 14 and 14', which are screw threaded to the hub members 2. These ring portions are also adapted to cover the eyes 12 of springs 11 to prevent their displacement. Integral with ring portion 14 is the spherical portion 15, and integral with the ring portion 14', is the spherical portion 16. Screw threaded to portion 15 is the extension member 18. Inserted in the annular chamber of member 18 is a felt packing ring 19 which is adapted to bear closely against the spherical surface of portion 16 for the purpose of excluding dust and dirt from entering the joint between the spherical surfaces of the telescoping portions of said casing and prevent the escape of the lubricant from within the lubricating chamber. Screw plug 17 inserted in the spherical portion 15 is for the purpose of inserting lubricant into the lubricating chamber, all of which is clearly shown in Fig. 1.

Among the advantages in the construction of this joint which seem worthy of special mention are the following:

The joint may be disassembled or "taken down" without the necessity of removing the shaft sections. To do this, first unscrew and remove extension member 18 onto the splined section of the shaft. Second, unscrew and remove member 14'—16, also onto the splined section of shaft. Third, remove the eyes of the springs 11 from the pins 13 when they will close up together. Then slide the coupling member back on the splined end of said shaft section until the engaging members are released, which will afford ample opportunity for cleaning and inspection of parts.

The driving members 3, being identically alike are susceptible of being rigidly inserted in either of the hubs 2. These, together with the transmission disk 5, being the most vital parts of the joint, can be reduced to a minimum in size and made of a grade of steel susceptible of a much higher grade of heat treatment and finishing to withstand greater wear and endurance than would be necessary with the other parts, thereby effecting a great saving in the cost of material and manufacture of these parts. The other parts or members of the joint may be made of a much cheaper grade of material and meet all requirements.

Referring to the construction shown in Fig. 11, in which is shown some modifications of construction, the hubs 2, driving members 3 and projections 4 are shown integral and of same material. Also, in place of using tension springs secured to the hubs 2 to retain the parts in their true spherical alinement as shown in Figs. 1 and 2, a bolt 20 inserted centrally through and splined within the spherical member 9, extending through the cupped members 10 and provided with cupped shaped washers 21 fitting the outside spherical surface of said cupped members with a compression spring 22 interposed between said washers and the head and nuts of said bolt, are used. A tapering hole, enlarged to allow of varying shaft angles is required in cup members 10. It will be apparent that the functions of the several parts or members have not been changed in this construction.

Referring to Fig. 12 which shows some slight modifications over those in Fig. 11, in which disk 5 has been eliminated and the projecting engaging members 4 of the driving members 3 have been increased in number and slightly changed in shape to that indicated by 23. These opposing members with their projecting engaging members are identically alike and engage directly with their opposing mate and when properly shaped permit of similar varying shaft angles. The same central spherical member and cups are used as in Fig. 11 and have the same functions.

While I have illustrated and described my improved joint in its preferred construction, I am aware that many minor changes and modifications in the details of construction can be made without departing from the essential features and functions of my invention.

Having thus illustrated and described my invention, what I claim and desire to secure by Letters Patent, is:—

1. A universal joint comprising a pair of opposing coupling members, a driving member provided with diametrically opposite driving jaws secured to each of said coupling members, a transmission disk provided with a plurality of slots and means for adjusting the same, said slots being adapted to operatively engage the jaws of said driving members, a central spherical member secured to said transmission disk, a pair of cup-shaped members secured to the interior of said driving members and adapted to engage opposite sides of said spherical member, a plurality of tension springs secured to the opposing coupling members to maintain the opposing parts of the joint in their true spherical alinement with said spherical member, a telescoping spherically-shaped casing secured to said coupling members to exclude dust and dirt and retain lubricant to the interior parts, and means for inserting lubricant through said casing.

2. A universal joint comprising a pair of opposing coupling members, a driving member provided with diametrically opposite driving jaws secured to each of said coupling members, a disk provided with a plurality of slots adapted to operatively engage the jaws of said driving members, a central spherical member integral with said disk, a pair of cup-shaped members secured to the interior of said driving members and adapted to engage opposite sides of said spherical member, a plurality of tension springs secured to the opposing coupling members to maintain the opposing parts of the joint in true spherical alinement with the central spherical member, a telescoping spherically shaped casing secured to the opposing coupling members to exclude dirt and retain lubricant to the interior members.

3. A universal joint comprising a pair of opposing coupling members provided with diametrically opposite driving jaws, a disk provided with a plurality of slots adapted to operatively engage said driving jaws, a central spherical member integral with said disk, a pair of cup-shaped members secured to said coupling members and adapted to engage opposite sides of said spherical member, a plurality of springs to maintain the opposing parts of the joint in true spherical alinement with said spherical member, a telescoping spherically shaped casing secured to the opposing coupling members to exclude dirt and retain lubricant, for the purpose specified.

4. A universal joint comprising a pair of opposing coupling members provided with suitable opposing driving jaws, a central spherical member, a pair of cup-shaped members secured to said coupling members and adapted to engage opposite sides of said spherical member, a plurality of springs to maintain the opposing members of the joint in true spherical alinement with said spherical member, a telescoping spherically shaped casing secured to the opposing coupling members to exclude dirt and retain lubricant, for the purpose specified.

5. A universal joint comprising a pair of opposing coupling members, a driving member provided with suitable driving jaws secured to each of said coupling members, a transmission disk provided with suitable slots adapted to operatively engage the jaws of said driving members, a central spherical member secured to said disk, a pair of cup-shaped members secured to said driving members and adapted to engage opposite sides of said spherical member, suitable means for maintaining the opposing parts of the joint in their true spherical alinement with said spherical member, a suitable telescoping casing secured to the coupling members, for the purpose specified.

6. A universal joint comprising a pair of opposing coupling members provided with suitable driving jaws, a transmission disk provided with slots adapted to operatively engage said driving jaws, a central spherical member secured to said disk, a pair of cup-shaped members secured to said coupling members and adapted to engage opposite sides of said spherical member, and suitable means for maintaining the opposing parts in true spherical alinement with said spherical member.

7. A universal joint comprising a pair of opposing coupling members provided with engaging driving jaws, a transmission disk provided with slots adapted to operatively engage said jaws, a central spherical member secured to said disk, and suitable means of engagement between said coupling members and said spherical member whereby said coupling members will be maintained in their true spherical alinement with said disk and with each other without the use of outer casings to engage said coupling members at their outer periphery for such purpose.

8. A universal joint comprising a pair of opposing coupling members provided with engaging driving jaws, in combination with a pair of cup-shaped members secured to said coupling members, a central spherical member interposed between said cup-shaped members, and suitable means for maintaining said cup-shaped members in working contact with said spherical member for the purpose of maintaining the members of the joint in their true spherical alinement without the use of external means to engage the outer periphery of said coupling members for such purpose.

WALTER S. WOOD.

Witnesses:
 STANLEY K. WOOD,
 FLORENCE M. WRIGHT.